(12) United States Patent
Obuchi et al.

(10) Patent No.: US 6,417,294 B1
(45) Date of Patent: Jul. 9, 2002

(54) FILMS AND MOLDED ARTICLES FORMED FROM ALIPHATIC POLYESTER COMPOSITIONS CONTAINING NUCLEATING AGENTS

(75) Inventors: Shoji Obuchi; Tatsuya Kawaguchi; Tomoyuki Nakata; Takayuki Watanabe; Yasuhiro Kitahara; Kazuhiko Suzuki; Masanobu Ajioka, all of Kanagawa-ken (JP)

(73) Assignee: Mitsui Chemicals, Inc. (JP)

( * ) Notice: Subject to any disclaimer, the term of this patent is extended or adjusted under 35 U.S.C. 154(b) by 0 days.

(21) Appl. No.: 08/767,880

(22) Filed: Dec. 17, 1996

(30) Foreign Application Priority Data

Dec. 21, 1995 (JP) ............................................. 7-333533
Feb. 13, 1996 (JP) ............................................. 8-025602

(51) Int. Cl.[7] ..................... C08G 63/06; C08G 63/88
(52) U.S. Cl. ................... 525/450; 428/35.7; 524/284; 525/437; 525/444
(58) Field of Search ....................... 428/35.7; 521/138; 264/54; 525/432, 437, 444, 450; 524/284

(56) References Cited

U.S. PATENT DOCUMENTS 4,835,203 A  5/1989  Sieverding .................. 524/227

FOREIGN PATENT DOCUMENTS

| EP | 0683207 | 11/1995 |
| JP | 6-299054 | * 10/1994 |
| JP | 8-27363 | 1/1996 |
| WO | WO94/06856 | 3/1994 |
| WO | WO96/07697 | 3/1996 |

* cited by examiner

*Primary Examiner*—Ellis Robinson
*Assistant Examiner*—Sandra M. Nolan
(74) *Attorney, Agent, or Firm*—Burns, Doane, Swecker, & Mathis, L.L.P.

(57) ABSTRACT

An aliphatic polyester formed item having transparency and crystallinity in combination by crystallizing, in the course of or after processing, an aliphatic polyester composition comprising aliphatic polyester and one or more transparent nucleating agent selected from the group consisting of aliphatic carboxylic acid amide, aliphatic carboxylic acid salt, aliphatic alcohol and aliphatic carboxylic acid ester having a melting point of 40–300° C.

6 Claims, No Drawings

FILMS AND MOLDED ARTICLES FORMED FROM ALIPHATIC POLYESTER COMPOSITIONS CONTAINING NUCLEATING AGENTS

BACKGROUND OF THE INVENTION AND RELATED ART

1. Field of the Invention

The present invention relates to a preparation process of a simultaneously transparent and crystallized formed item which comprises an aliphatic polyester and one or more transparent nucleating agent ingredients selected from the group consisting of aliphatic carboxylic acid amide, aliphatic carboxylic acid salt, aliphatic alcohol and aliphatic carboxylic acid ester; and a formed item prepared by the process.

2. Related Art

Recently, general purpose plastics have led to public issues after use. Disposal of waste plastics increases the amount of refuse. Additionally, these plastics are scarcely degraded in the natural environment and thus semipermanently remain under ground even after burial disposal. Further, abandoned plastics have caused problems such as an adverse effect on the beautiful scenery and impairment of living environment for marine organisms.

On the other hand, thermoplastic and degradable polymers which include polyhydroxycarboxylic acid such as polylactic acid and aliphatic polyester such as polybutylene succinate, a polycondensation product of aliphatic polyhydric alcohol and aliphatic polycarboxylic acid, have been developed as countermeasures for these problems.

These polymers can completely decompose in an animal body within a few months to one year. Further, these polymers begin to degrade within a few weeks in a humid environment such as in soil or in sea water and disappear after an year to several years. The final decomposition products of these plastics are lactic acid, carbon dioxide and water which are nontoxic to a human body. Such characteristic of the plastics has now received attention as medical materials and a substitute for general-purpose resins.

On the other hand, in recent years, the demand for transparent plastic films has increased and their uses are making rapid progress accompanied by dramatical development of technology in the field of electronics, mechatronics, optoelectronics and laser which include optical communications, CD, CD-ROM, CD-R, LD, DVD and magneto-optic recording, liquid crystal, optic, office automation (OA) and factory automation.

Specific examples of uses include an overhead projector film, printing plate film, tracing film, food wrapping film and agricultural film.

Practical examples of high-performance uses include, for example, an electrically conductive transparent film such as a screen touch panel for computer input, thermal reflection film, liquid crystal display film, polarizing film for liquid crystal display, and printed circuit board (PCB).

Conventionally, glass, acrylates (polymethyl methacrylate (PMMA), polycarbonate (PC) and other less flexible and rigid resins have been used for these uses. However, recently, it has been inclined also in these uses to require replacement with a transparent film having excellent flexibility, processability and thermal resistance.

A polyethylene terephthalate (PET) film can conform to a portion of such substitution demand. However, PET leads to problems, for example, in uses which require degradability.

In view of such background, a transparent film which has transparency, thermal resistance (crystallinity), and degradability in combination is anticipated to have great significance in the technical field of the transparent film.

Next, degradable and thermoplastic polymers such as polylactic acid, copolymer of lactic acid with other hydroxycarboxylic acid, and copolymer of lactic acid with aliphatic polyhydric alcohol and aliphatic polycarboxylic acid are aliphatic polyester comprising lactic acid as structural units. Processed items of these degradable polymers include, for example, a bottle and other molded articles having a three-dimensional shape, unstretched films and sheets having two-dimensional shape and unstretched filaments and yarns having a one-dimensional shape. Immediately after processing, these processed items are usually amorphous and almost absent from crystals which have a size equal to or larger than the wavelength of light beams and result in light scattering. Consequently, these items are transparent.

However, these transparent processed items are usually inferior in thermal resistance due to the amorphous state. For example, amorphous polylactic acid containers are excellent in transparency and poor in thermal resistance, and thus cannot be used for hot water or a microwave oven. As a result, the uses of these transparent items have been restricted.

Accordingly, crystallinity is increased in order to improve thermal resistance by charging polymer to the mold maintained in the neighborhood of crystallization temperature in the processing or by heat-treating (annealing) the amorphous formed item after processing. Such procedures usually accelerate rapid growth of crystals, for example, crystals (for example, spherulites) which have a size equal to or larger than the wavelength of light beams and result in light scattering, crystals grow-up to the size larger than the wavelength of visible light, and the processed items thus obtained become opaque.

Crystalline aliphatic polyester such as polybutylene succinate usually crystallize and become opaque immediately after forming due to presence of crystals which have a size equal to or larger than the wavelength of light beams and scatter the light.

Thus, conventional technique has been difficult like antinomy to simultaneously provide transparency and crystallinity for formed items of aliphatic polyester.

On the other hand, it has been known in the technical field of general-purpose resin to control growth of the crystals and simultaneously provide transparency and crystallinity for the formed items by addition of a transparent nucleating agent (clarifying crystallization nuclei). The transparent nucleating agent is said, concerning the crystal, to have inhibiting action of excess growth in [size], increasing action in [numbers] and accelerating action in [crystallization velocity].

Specific examples thereof include, for example, a technique for providing polypropylene resin formed items with transparency by addition of a sorbitol derivative to polypropylene resin, or a process for adding fine powder of aromatic polyester comprising terephthalic acid and resorcinol as major structural units in order to accelerate crystallization velocity of polyethylene terephthalate.

However, in the technical field of aliphatic polyester, techniques involving crystals have not yet been known to inhibit excess growth in [size], increase in [numbers], accelerate in [crystallization velocity], and thus provide molded items with transparency and crystallinity at the same time.
[Action Mechanism of the Transparent Nucleating Agent]

The transparency emerging mechanism of transparent nucleating agent in the processed items of crystallinity resin is not so clearly known. Further, the invention is not confined by specific mechanism or hypothesis.

However, the mechanism for developing transparency by the transparent nucleating agent in the crystalline resin formed items can also be illustrated by the following models.

1) A model of crystalline resin formed items without addition of a transparent nucleating agent When a resin formed item is crystallized without addition of a transparent nucleating agent, a small number of crystal nuclei provides a basis of crystal growth as compared with the case of adding the transparent nucleating agent. Thus a relatively small number of crystals are generated and each crystal grows to a giant size. That is, on the basis of a unit volume, a relatively small number of large crystals is formed even under equal crystallinity as compared with the case of adding the transparent nucleating agent. As a result, the crystals having a size equal to or larger than the wavelength of visible light are formed, scatter visible light, and inhibit straight propagation thereof. Consequently, formed items of crystalline resin become opaque in the absence of the transparent nucleating agent.

(2) A model of formed items of crystalline resin in the presence of the transparent nucleating agent When a resin formed item is crystallized in the presence of the transparent nucleating agent, the transparent nucleating agent becomes a basis of crystal growth and provides an overwhelmingly large number of crystals as compared with the case in the absence of the transparent nucleating agent. As a result, each crystal has an overwhelmingly small size.

That is, on the basis of a unit volume, an overwhelmingly large number of small crystals generates even under equal crystallinity as compared with the case absent from the transparent nucleating agent. As a result, the crystals thus formed have a considerably small size as compared with the wavelength of visible light, visible light propagates straightly without scattering, and the formed items of crystalline resin comprising the transparent nucleating agent become transparent.

[Additives for aliphatic polyester]

In the technical field of cooperating additives for aliphatic polyester, for example, the following techniques have been known.

Japanese Laid-Open Patent Hei 6-299054 has disclosed a technique for providing softened pellets with blocking resistance or slip property by adding 0.001–0.05 part by weight of higher fatty acid bisamide, for example, ethylenebis stearamide and metal salt of higher fatty acid, for example, calcium stearate to 100 parts by weight of pellets consisting of a thermoplastic polymer composition which comprises polylactic acid or a copolymer of lactic acid and another hydroxycarboxylic acid.

The numerical value restriction of 0.001–0.05 part by weight in the disclosure has critical significance in view of exhibiting optimum blocking resistance or slip property. That is, an amount exceeding 0.05 part by weight leads to mutual slip of pellets and remarkably lowers processing ability.

The disclose differs from the present invention in the following two points.

(1) In the disclosure, the polymer pellets are added with an additive (lubricant or anti-blocking agent) and stained with their surface. Their effects are exhibited when pellets melt from solid state in the processing. On the other hand, in the present invention, an additive (transparent nucleating agent) is uniformly melt-mixed with the polymer ingredients and the effects are exhibited when pellets are solidified and crystallized from the molten state or crystallized after solidification.

(2) In the disclosure, a relatively small amount (0.05% by weight or less) of the additive (lubricant or anti-blocking agent) in added to the polymer pellets. On the other hand, the present invention adds a relatively large amount (0.1% by weight or more) of the additive (transparent nucleating agent) to the polymer ingredients.

(3) In the disclosure, the invention is the method to obtain an amorphous formed item. On the other hand, the present invention is the method to obtain a crystal formed item.

Japanese Laid-Open Patent Hei 8-27363 has disclosed a molding process of a biodegradable lactic acid-based polymer comprising melt-kneading 100 parts by weight of a thermoplastic polymer composition mainly consisting of polylactic acid or a copolymer of lactic acid with another hydroxycarboxylic acid and 0.051–1.0 part by weight of fatty acid, fatty acid amide or mixture of fatty acid and fatty acid amide and carrying out injection molding.

The thermoplastic polymer composition mainly consisting of polylactic acid or a copolymer of lactic acid with the other hydroxycarboxylic acid not always has good release characteristics and a mold release agent is sometimes required. Specifically injection molding which prepares many molded articles by one cycle requires good mold release characteristics in particular in order to maintain favorable productivity. However, common mold release agents have problems of lowering transparency and strength of the molded articles.

The disclosure is a technique for solving these problems by blending a prescribed amount of fatty acid and/or fatty acid amide with a thermoplastic polymer composition mainly consisting of polylactic acid or a copolymer of lactic acid and the other hydroxycarboxylic acid, melt-kneading thus blended mixture, and successively carrying out injection molding. Such procedures can provide excellent release characteristics for the molded articles while maintaining transparency and strength in the amorphous state.

The disclosure and the present invention differ in the following two points.

(1) No heat treatment after molding the articles is the requisite of the disclosure. On the other hand, the heat treatment under prescribed conditions is the requisite for aliphatic polyester of the present invention.

(2) The disclosure is particularly effective for injection molding which prepares many molded products in one cycle. On the other hand, the present invention is effective for injection molding and also for other processing methods.

European Laid-Open Patent 683207 has disclosed a technique for preparing a L-lactic acid polymer composition which comprises 100 parts by weight of a mixture consisting of 80–95% by weight of a L-lactic acid polymer having a L-lactic acid ratio of 75% or more and 5–20 parts by weight of a plasticizer selected from the group consisting of polyhydric alcohol ester and hydroxypolycarboxylic acid ester, 0.1–5 parts by weight of an anti-blocking agents comprising 90% or more $SiO_2$ and having an average particle size of 7–50 nm, and 0.1–2 parts by weight of a lubricant; crystallizing the composition by heat-treating at 40–65° C., and carrying out injection molding to prepare a molded article.

A L-lactic acid polymer having a L-lactic acid ratio of 75% or more has a low glass transition temperature, for example, polylactic acid has a glass transition temperature of about 58° C. Thus, when the pellets thereof are tried to be charged from a hopper to the processing step, softened pellet surfaces are mutually fuse-bonded by heat and pressure in the bottom of the hopper, solidify like a cluster and lead to problems.

When the fuse-bonded pellets are fed as intact to the molding zone of the machine, quality of the molded articles such as processing ability, transparency, strength, flexibility, appearance and smoothness is impaired to cause problems.

The disclosure is a technique for overcoming these problems by blending a L-lactic acid polymer having a L-lactic acid ratio of 75% or more with a small amount of a specific compound, pelletizing the mixture to provide blocking resistance and slip characteristics for the pellets, and further heat-treating and crystallizing the pellets to provide thermal resistance for the pellets, and thus making the pellet surface difficult to fuse-bond.

The disclosure differs from the present invention in the following two points.
(1) In the disclosure, the heat treatment prior to molding is the requisite. On the other hand, in the present invention, the heat treatment in the course of or after processing is the requisite for aliphatic polyester.
(2) In the disclosure, the anti-blocking agent, for example, $SiO_2$ is the requisite in order to provide blocking resistance. On the other hand, in the present invention, the anti-blocking agent, for example, $SiO_2$ is not the requisite.
(3) In the disclosure, the additives such as lubricants and anti-blocking agents are added to the pellets and deposited to the surface of the pellets and successively heat-treatment is carried out. The effect is exhibited when the pellets are melted in molding process. On the other hand, in the present invention, the additives (transparent nucleating agents) are uniformly melt-blended to the polymer and the effect is exhibited when the polymer is solidified and crystallized from the molten state or when the polymer is crystallized after soidification.

SUMMARY OF THE INVENTION

As stated above, conventional techniques have been difficult to simultaneously provide transparency and crystallinity for aliphatic polyester such as polylactic acid, a copolymer of aliphatic polyhydric alcohol and aliphatic polycarboxylic acid.

The present inventors have recognized that simultaneous exhibition of transparency and crystallinity in a molded item of aliphatic polyester is a very significant subject for solving these problems. Such essential understanding on the problems has never been made by those who are skilled in the art.

On the basis of the above view point, the present inventors have practically injection molded aliphatic polyester such as polylactic acid and a copolymer of lactic acid and other hydroxycarboxylic acid and/or a copolymer of aliphatic polyhydric alcohol and aliphatic polycarboxylic acid in the presence of a transparent nucleating agent. The transparent nucleating agents which have been used are sorbitol derivatives for nucleating polypropylene resin, phosphorus-based nucleating agents, talc, ultra fine silica having a size of 1 to several dozen nm, calcium lactate and sodium benzoate. However, transparency and crystallinity could not be provided at the same time for the aliphatic polyester in the presence of these agents alone.

Thus, simultaneous exhibition of transparency and crystallinity (thermal resistance) was difficult even though known transparent nucleating agents were used in the course of or before or after processing by common injection molding, flow molding, compression molding and other processing techniques, in the case of processing aliphatic polyester such as polylactic acid, a copolymer of lactic acid other hydroxycarboxylic acid and/or a copolymer of aliphatic polyhydric alcohol and aliphatic polycarboxylic acid.

Therefore, one object of the invention is to provide transparency and crystallinity (thermal resistance) at the same time for a formed item of polylactic acid and other aliphatic polyester.

As a result of an intensive investigation in order to accomplish the above object, the present inventors have found that addition of a specific compound to aliphatic polyester to give aliphatic polyester composition, processing said composition and crystallization of the obtained formed item in the course of or after processing can perform high crystallization while maintaining transparency and provide thermal resistance. Thus, the present invention has been completed.

That is, the present invention is specified by the following subject-matters.
(1) A preparation process of an aliphatic polyester formed item having transparency and crystallinity in combination comprising processing an aliphatic polyester composition comprising aliphatic polyester which develops no crystallization upon a temperature drop from the melting point to the glass transition temperature at a velocity of 10° C./min, and one or more transparent nucleating agent selected from the group consisting of an aliphatic carboxylic acid amide, an aliphatic carboxylic acid salt, an aliphatic alcohol and an aliphatic carboxylic acid ester having a melting point of 40–300° C., and carrying out heat-treatment in the course of or after processing.
(2) A preparation process of an aliphatic polyester formed item having transparency and crystallinity in combination comprising processing an aliphatic polyester composition comprising aliphatic polyester which generates crystals upon a temperature drop from the melting point to the glass transition temperature at a velocity of 10° C./min, and one or more transparent nucleating agent selected from the group consisting of an aliphatic carboxylic acid amide, an aliphatic carboxylic acid salt, an aliphatic alcohol and an aliphatic carboxylic acid ester having a melting point of 40–300° C.
(3) The preparation process of the aliphatic polyester formed item according to (1) wherein the ratio of the transparent nucleating agent to aliphatic polyester in the aliphatic polyester composition is 0.1–10 parts by weight of the transparent nucleating agent for 100 parts by weight of aliphatic polyester.
(4) The preparation process of the aliphatic polyester formed item according to (2) wherein the ratio of the transparent nucleating agent to aliphatic polyester in the aliphatic polyester composition is 0.1–10 parts by weight of the transparent nucleating agent for 100 parts by weight of aliphatic polyester.
(5) The preparation process of the aliphatic polyester formed item according to (3) wherein the aliphatic polyester is polylactic acid and the transparent nucleating agent is aliphatic carboxylic acid amide.
(6) The preparation process of the aliphatic polyester formed item according to (5) wherein the aliphatic carboxylic acid amide is one or more compounds selected from the group consisting of ethylenebiscaproamide, ethylenebislauramide, ethylenebisoleamide, m-xylylenebisstearamide and m-xylylenebis-12-hydroxystearamide.
(7) The preparation process of the aliphatic polyester formed item according to (3) wherein the aliphatic polyester is a copolymer having a polylactic acid block and a polybutylene succinate block.

(8) The preparation process of the aliphatic polyester formed item according to (7) wherein the transparent nucleating agent is one or more compounds selected from the group consisting of palmitamide, stearamide, erucamide, beheamide, ricinolamide, hydroxystearamide, N-oleylpalmitamide, N-stearylerucamide, ethylenebiscapramide, ethylenebislauramide, ethylenebisoleamide, m-xylylenebisstearamide, m-xylylenebis-12-hydroxystearamide, sodium stearate, potassium stearate, zinc stearate, calcium montanate, ethylene glycol distearate and stearyl alcohol.

(9) The preparation process of the aliphatic polyester formed item according to (4) wherein the aliphatic polyester is polybutylene succinate.

(10) The preparation process of the aliphatic polyester formed item according to (9) wherein the transparent nucleating agent is one or more compounds selected from the group consisting of palmitamide, steramide, erucamide, beheamide, ricinolamide, hydroxysteramide, N-oleylpalmitamide, N-stearylerucamide, ethylenebiscapramide, ethylenebislauramide, ethylenebisoleamide, m-xylylenebisstearamide, m-xylylenebis-12-hydroxystearamide, sodium stearate, potassium stearate, zinc stearate, calcium montanate, ethylene glycol distearate and stearyl alcohol.

(11) The preparation process of the aliphatic polyester formed item according to (1) wherein the heat treatment comprises melting the aliphatic polyester composition, successively filling said composition into a mold maintained in a temperature range from the crystallization initiating temperature to the crystallization terminating temperature of said aliphatic polyester composition, and crystallizing said composition in the mold.

(12) The preparation process of the aliphatic polyester formed item according to (1) wherein the heat treatment comprises cooling and solidifying the molten aliphatic polyester composition in a mold to obtain an amorphous formed item, and successively crystallizing said formed item in a temperature range from the glass transition point to the melting point of said composition.

(13) A formed item of the aliphatic polyester obtained by the preparation process according to (1).

(14) A formed item of the aliphatic polyester obtained by the preparation process according to (2).

(15) The formed item of the aliphatic polyester according to (13) wherein the transparency is 30% or less in a Haze value for 1 mm thickness and crystallinity is 10% or more in crystallization degree.

(16) The formed item of the aliphatic polyester according to (14) wherein the transparency is 30% or less in a Haze value for 1 mm thickness and crystallinity is 10% or more in crystallization degree.

(17) A formed item of the aliphatic polyester comprising an aliphatic polyester and one or more transparent nucleating agents selected from the group consisting of an aliphatic carboxylic acid amide, an aliphatic carboxylic acid salt, an aliphatic alcohol and an aliphatic carboxylic acid ester having a melting point of 40–300° C., and having transparency and crystallinity in combination.

(18) The formed item of the aliphatic polyester according to (17) wherein the ratio of the transparent nucleating agent to aliphatic polyester is 0.1–10 parts by weight of the transparent nucleating agent for 100 parts by weight of aliphatic polyester.

(19) The formed item of the aliphatic polyester according to (18) wherein the aliphatic polyester is polylactic acid.

(20) The formed item of the aliphatic polyester according to (18) wherein the aliphatic polyester is a copolymer having a polylactic acid block and a polybutylene succinate block or polybutylene succinate.

(21) The formed item according to (19) wherein the transparent nucleating agent is an aliphatic carboxylic acid amide.

(22) The formed item according to (21) wherein the aliphatic carboxylic acid amide is one or more compounds selected from the group consisting of etheylenebiscapramide, ethylenebislauramide, ethylenebisoleamide, m-xylylenebisstearamide and m-xylylenebis-12-hydroxystearamide.

(23) The formed item according to (20) wherein the transparent nucleating agent is one or more compounds selected from the group consisting of palmitamide, stearamide, erucamide, behenamide, ricinolamide, hydroxysteramide, N oleylpalmitamide, N-stearylerucamide, ethylenebiscapramide, ethylenebislauramide, ethylenebisoleamide, m-xylylenebisstearamide, m-xylylenebis-12-hydroxystearamide, sodium stearate, potassium stearate, zinc stearate calcium montanate, ethylene glycol distearate and stearyl alcohol.

(24) The formed item according to (17) wherein the transparency is 30% or less in a Haze value for 1 mm thickness and crystallinity is 10% or more in crystallization degree.

(25) A process for using one or more compounds for a transparent nucleating agent of polylactic acid, the compounds being selected from the group consisting of ethylenebiscapramide, ethylenebislauramide, ethylenebisoleamide, m-xylylenebisstearamide and m-xylylenebis-12-hydroxystearamide.

(26) A process for using one or more compounds for a transparent nucleating agent of a copolymer having a polylactic acid block and a polybutylene succinate block and/or a polybutylene succinate, the compounds being selected from the group consisting of palmitamide, stearamide, erucamide, behenamide, ricinolamide, hydroxystearamide, N-oleylpalmitamide, N-stearylerucamide, ethylenebiscapramide, ethylenebislauramide, ethylenebisoleamide, m-xylylenebisstearamide, m-xylylenebis-12-hydroxystearamide, sodium oleate, sodium stearate, potassium stearate, zinc stearate, calcium montanate, ethylene glycol distearyl alcohol.

DETAILED DESCRIPTION OF THE INVENTION

In the present invention, aliphatic polyester includes a homopolymer of aliphatic hydroxycarboxylic acid such as polylactic acid, polyglycolic acid and polycaproic acid; a copolymer of hydroxycarboxylic acid such as a copolymer of lactic acid and glycolic acid, and a copolymer of lactic acid and caproic acid; homopolymer of aliphatic polyhydric alcohol and aliphatic polycarboxylic acid such as polybutylene succinate and polyethylene adipate; a copolymer of aliphatic polyhydric alcohol and aliphatic polycarboxylic acid such as a copolymer of butanediol with adipic acid and succinic acid and a copolymer of succinic acid with ethylene glycol and butanediol; a copolymer of aliphatic hydroxycarboxylic acid, aliphatic polyhydric alcohol and aliphatic polycarboxylic acid such as a block copolymer of polylactic acid and polybutylene succinate; and a mixture of these homopolymers and copolymers. In the case of the mixture, a compatibilizer can be used.

Further, the polyester can also be at least portionally crosslinked with polyisocyanate such as xylene diisocyanate or 2,4-tolylene diisocyanate or polysaccharide such as cellulose or acetylcellulose. The structure of polyester can be at least portionally linear, cyclic, branched, star or three dimensional network structure.

Specific examples of aliphatic hydroxycarboxylic acid which constitutes aliphatic polyester in the invention include glycolic acid, lactic acid, 3-hydroxybutyric acid, 4-hydroxybutyric acid, 4-hydroxyvaleric acid, 5-hydroxyvaleric acid and 6-hydroxycaproic acid. These acids can be used singly or as a mixture. When aliphatic hydroxycarboxylic acid has an asymmetric carbon atom, L-isomer, D-isomer and the mixture thereof, that is, racemic modification can be used.

Practical examples of aliphatic polycarboxylic acid which constitutes aliphatic polyester in the invention include oxalic acid, succinic acid, malonic acid, glutaric acid, adipic acid, pimelic acid, suberic acid, azelaic acid, sebacic acid, undecanoic diacid, dodecanoic diacid and other aliphatic dicarboxylic acids. These acids can be used singly or as a mixture.

Representative examples of aliphatic polyhydric alcohol which constitutes aliphatic polyester include ethylene glycol, diethylene glycol, triethylene glycol, propylene glycol, dipropylene glycol, 1,3-butanediol, 1,4-butanediol, 3-methyl-1,5-pentanediol, 1,6-hexanediol, 1,9-nonanediol, neopentyl glycol, tetramethylene glycol and 1,4-cyclohexanedimethanol. These alcohols can be used singly or as a mixture.

When aliphatic polyester is a copolymer in the invention, configuration mode of the copolymer can be a random copolymer, alternating copolymer, block copolymer and graft copolymer.

No particular limitation is imposed upon the molecular weight of aliphatic polyester in the invention so long as mechanical properties of packaging materials, containers and other formed items are substantially sufficient. Generally, the weight average molecular weight is usually 10,000–5,000,000, preferably 30,000–3,000,000, more preferably 50,000–2,000,000, still more preferably 70,000–1,000,000, most preferably 90,000–500,000. When the weight average molecular weight is less than 10,000, mechanical properties are unsatisfactory. On the other hand, the molecular weight greater than 5,000,000 leads to difficulty in handling or disadvantage in economy.

Aliphatic polyester of the invention can control the weight average molecular weight and molecular weight distribution in the desired range by suitably selecting the reaction conditions such as kind of the solvent, kind and amount of the catalyst, reaction temperature, reaction time, treatment method of azeotropically distilled solvent, and dehydration degree of the solvent in the reaction system.

Preferred aliphatic polyester in the invention is polylactic acid, poly-L-lactic acid in particular; polycaproic acid, poly-ε-caproic acid in particular; a block copolymer of polylactic acid and poly-6-hydroxycaproic acid, a block copolymer of poly-L-lactic acid and poly-6-hydroxycaproic acid in particular; polybutylene succinate; and a block copolymer of polylactic acid and polybutylene succinate, a block copolymer of poly-L-lactic acid and polybutylene succinate in particular.

No particular restriction is put upon the preparation process of aliphatic polyester used in the invention.

Some aliphatic polyester of the invention can be prepared by the process of Preparation Example 2 or 3 below by reference to the processes disclosed, for example, in U.S. Pat. Nos. 5,310,865 and 5,401,796. That is, aliphatic polyester can be prepared from lactic acid and/or other hydroxy-carboxylic acid, or aliphatic diol and aliphatic dicarboxylic acid, or a mixture thereof by the direct dehydration polycondensation process which carries out dehydration condensation of these raw materials in the presence of an organic solvent and catalyst.

Some aliphatic polyester used in the invention can be prepared by the process disclosed in U.S. Pat. No. 2,703,316. That is, aliphatic polyester can be prepared by an indirect polymerization process which once dehydrates lactic acid and/or other hydroxycarboxylic acid into a cyclic dimer thereof and carries out ring-opening polymerization of the dimer.

Further, some aliphatic polyester for use in the invention can be prepared by the process of Preparation Examples 4–6 below in accordance with the process disclosed in EP 712880A2. That is, aliphatic polyester can be prepared by reacting two or more homopolymers of aliphatic polyester in the presence of an organic solvent.

No particular restriction is imposed upon aliphatic carboxylic acid amide used for a transparent nucleating agent so long as the melting point is the range of 40–300° C.

Exemplary aliphatic carboxylic acid amides which can be used in the invention includes, for example, lauramide, palmitamide, oleamide, stearamide, erucamide, behenamide, ricinolamide, hydroxystearamide and other aliphatic monocarboxylic acid amide; N-oleylpalmitamide, N-oleyloleamide, N-oleylstearamide, N-stearyloleamide, N-stearylstearamide, N-stearylerucamide, methylolstearamide, methylolbehenamide, and other N-substituted aliphatic monocarboxylic acid amides; methylenebisstearamide, ethylenebislauramide, ethylenebiscapramide, ethylenebisoleamide, ethylenebisstearamide, ethylenebiserucamide, ethylenebisbehenamide, ethylenebisisostearamide, ethylenebishydroxystearamide, butylenebisstearamide, hexamethylenebisoleamide, hexamethylenebisstearamide, hexamethylenebisbehenamide, hexamethylenebis hydroxystearamide, m-xylylenebisstearamide, m-xylylenebis-12-hydroxystearamide, and other aliphatic carboxylic acid bisamides; N,N'-dioleylsebacamide, N,N'-dioleyladipamide, N,N'-distearyladipamide, N,N'-distearylsebacamide and other N-substituted aliphatic carboxylic acid bisamides; and N-butyl-N'-stearylurea, N-propyl-N'-stearylurea, N-allyl-N'-stearylurea, N-phenyl-N'-stearylurea, xylylenebisstearylurea, tolylenebisstearylurea, hexamethylenebisstearylurea, diphenylmethanebiss tearylurea, diphenylmethanebislaurylurea and other N-substituted ureas. These aliphatic carboxylic acid amides can be used singly or as a mixture.

When aliphatic polyester is a copolymer having a polylactic acid block and polybutylene succinate block or a homopolymer of butylene succinate, aliphatic monocarboxylic acid amide, N-substituted aliphatic carboxylic acid amide and aliphatic carboxylic acid bisamide are preferably used, and in particular, palmitamide, stearamide, erucamide, behenamide, ricinolamide, hydroxystearamide, N-oleylpalmitamide, N-stearylerucamide, ethylenebiscapramide, ethylenebisoleamide, etylenebislauramide, m-xylylenebisstearamide, and m-xylylenebis-12-hydroxystearamide are more preferably used.

When aliphatic polyester is a polylactic acid, aliphatic carboxylic acid bisamide are preferably used, and in particular, ethylenebiscapramide, ethylenebisoleamide, etylenebislauramide, m-xylylenebisstearamide, and m-xylylenebis-12-hydroxystearamide are more preferably used.

No particular restriction is put upon the aliphatic carboxylic acid salt which can be used for the transparent nucleating agent in the invention so long as the salt has a melting point of 40–300° C.

The aliphatic carboxylic acid salt for use in the invention is represented by the general formula (1):

$$R\text{—}COOM \tag{1}$$

wherein R is a saturated, unsaturated, straight, or branched hydrocarbon group having 10–40 carbon atoms, and M is a metal selected from lithium, sodium, potassium, calcium, magnesium, beryllium, barium, aluminum, zinc, copper, cobalt, nickel, lead, thallium and silver.

Aliphatic carboxylic acid salts include, for example, salts consisting of aliphatic carboxylic acid such as lauric acid, myristic acid, palmitic acid, oleic acid, behenic acid, stearic acid, isostearic acid, and dimer acid and a metal such as lithium, sodium, potassium, calcium, magnesium, beryllium, barium, aluminum, zinc, copper, cobalt, nickel, lead, thallium and silver.

Specific examples of aliphatic carboxylic acid salts include sodium laurate, potassium laurate, potassium hydrogen laurate, magnesium laurate, calcium laurate, zinc laurate, silver laurate and other lauric acid salts; lithium myristate, sodium myristate, potassium hydrogen myristate, magnesium myristate, calcium myristate, zinc myristate, silver myristate and other myristic acid salts; lithium palmitate, potassium palmitate, magnesium palmitate, calcium palmitate, zinc palmitate, copper palmitate, lead palmitate, thallium palmitate, cobalt palmitate and other palmitic acid salts; sodium oleate, potassium oleate, magnesium oleate, calcium oleate, copper oleate, zinc oleate, nickel oleate, lead oleate, thallium oleate and other oleic acid salts; sodium stearate, potassium stearate, lithium stearate, magnesium stearate, calcium stearate, barium stearate, aluminum stearate, zinc stearate, nickel stearate, beryllium stearate, thallium stearate, lead stearate and other stearic acid salts; sodium isostearate, potassium isostearate, magnesium isostearate, calcium isostearate, barium isostearate, aluminum isostearate, zinc isostearate, nickel isostearate and other isostearic acid salts; sodium behenate, potassium behenate, magnesium behenate, calcium behenate, barium behenate, aluminum behenate, zinc behenate, nickel behenate and other behenic acid salts; and sodium montanate, potassium montanate, magnesium montanate, calcium montanate, barium montanate, aluminum montanate, zinc montanate, nickel montanate and other montanic acid salts. These aliphatic carboxylic acid salts can be used singly or as a mixture.

When aliphatic polyester is a copolymer consisting of a polylactic acid block and a polybutylene succinate block or a homopolymer of butylene succinate, stearic acid salts and montanic acid salts are preferably used and specifically sodium stearate, potassium stearate, zinc stearate and calcium montanate are more preferably used.

Aliphatic alcohol which can be used for a transparent nucleating agent in the invention is an aliphatic mono- or polyhydric alcohol having a melting point of 40–300° C. and includes a compound represented by the general formula (2);

$$X\text{—}R\text{—}OH \tag{2}$$

wherein R is a saturated or unsaturated, or straight or branched hydrocarbon group having 6–40 carbon atoms and X is a hydrogen atom or a hydroxyl group.

Aliphatic alcohol includes also cyclic alcohol.

Specifically, aliphatic alcohol includes aliphatic mono alcohol such as pentadecyl alcohol, cetyl alcohol, heptadecyl alcohol, stearic alcohol, nonadecyl alcohol, eicosyl alcohol, ceryl alcohol, melissyl alcohol and other aliphatic monohydric alcohols; 1,6-hexanediol, 1,7-heptanediol, 1,8-octanediol, 1,9-nonanediol, 1,10-decanediol and other aliphatic polyhydric alcohols; and cyclopentane-1,2-diol, cyclohexane-1,2-diol, cyclohexane-1,4-diol and other alicyclic alcohols. These alcohols can be used singly or as a mixture.

When aliphatic polyester is a copolymer consisting of a polylactic acid block and a polybutylene succinate block or a homopolymer of butylene succinate, aliphatic monohydric alcohol, especially, stearyl alcohol is suitably used.

Aliphatic carboxylic acid ester which can be used as the transparent nucleating agent in the invention is a compound having a melting point of 40–300° C. and is aliphatic monocarboxylic acid ester represented by the general formula (3), ethylene glycol monoester and ethylene glycol diester which are represented by the general formula (4), and glycerol monoester, glycerol diester and glycerol triester which are represented by the general formula (5).

$$R^1COOR^2 \tag{3}$$

$$\begin{array}{l} CH_2(CH_2)_{n1}\text{—}OX_1 \\ | \\ CH_2(CH_2)_{n2}\text{—}OX_2 \end{array} \tag{4}$$

$$\begin{array}{l} CH_2(CH_2)_{n3}\text{—}OX_3 \\ | \\ CH_2(CH_2)_{n4}\text{—}OX_4 \\ | \\ CH_2(CH_2)_{n5}\text{—}OX_5 \end{array} \tag{5}$$

wherein $R^1$ is a saturated or unsaturated, or straight or branched hydrocarbon group having 10–40 carbon atoms and $R^2$ is a saturated or unsaturated, or straight or branched hydrocarbon group having 1–40 carbon atoms; $X_1$, $X_2$, $X_3$, $X_4$ and $X_5$ are a hydrogen atom or a saturated or unsaturated, or straight or branched acyl group having 2–41 carbon atoms; at least one in $X_1$ and $X_2$ is a saturated or unsaturated, or straight or branched acyl group having 2–41 carbon atoms and at least one in $X_3$, $X_4$ and $X_5$ is a saturated or unsaturated, or straight or branched acyl group having 2–41 carbon atoms; n1, n2, n3, n4 and n5 are an integer of 0–4 and can be respectively the same or different.

Specific compounds include, for example, cetyl laurate, cetyl myristate, palmitic acid isopropylidene ester, dodecyl palmitate, tetradecyl palmitate, pentadecyl palmitate, octadecyl palmitate, cetyl palmitate, cetyl stearate, ethyl behenate and other aliphatic monocarboxylic acid esters; glycol monolaurate, glycol monopalmitate, glycol monostearate and other ethylene glycol monoesters; glycol dilaurate, glycol dipalmitate, glycol distearate and other ethylene glycol diesters; glycerol monolaurate, glycerol monomyristate, glycerol monopalmitate, glycerol monostearate and other glycerol monoesters; glycerol dilaurate, glycerol dimyristate, glycerol dipalmitate, glycerol distearate and other glycerol diesters; and glycerol trilaurate, glycerol trimyristate, glycerol tripalmitate, glycerol tristearate, palmitodiolein, palmitodistearin, stearodipamitin, oleodistearin and other glycerol triesters. These compounds can be used singly or as a mixture.

When aliphatic polyester is a copolymer having a polylactic acid block and a polybutylene succinate block or a homopolymer of butylene succinate, ethylene glycol diesters are suitably used, particularly ethylene glycol distearate is more suitably used.

The amount of aliphatic carboxylic acid amide, aliphatic carboxylic acid salt, aliphatic alcohol or aliphatic carboxylic acid ester for use in the invention is usually 0.1–10% by weight, preferably 0.1–7% by weight, more preferably 0.3–5% by weight, most preferably 0.5–3% by weight for the amount of aliphatic polyester. When the amount is less than 0.1% by weight, the effect as the transparent nucleating agent becomes insufficient. On the other hand, the amount exceeding 10% by weight cannot provide further increase in the effect on the transparent nucleation and additionally gives adverse effect on the appearance and properties of the formed item.

The formed item prepared according to the preparation process of the invention can be incorporated, so long as transparency can be maintained, with inorganic additives in order to improve various properties such as a crystallization velocity, thermal resistance, mechanical strength and anti-blocking property.

Representative inorganic additives which can be used include, for example, talc, kaolin, $SiO_2$, and clay. However, amount, particle size and other conditions of these inorganic additives must be selected so as not to impair transparency of the processed item of the resin.

In order to maintain transparency of the processed item, it is generally required to select a particle size substantially smaller than the wavelength of visible light. More specifically, in the case of improving anti-blocking property, for example, $SiO_2$ having a particle size of 1–50 nm can be suitably used without impairing transparency.

In the preparation process of the invention, in order to further accelerate crystallization velocity in the course of processing, for example, in the mold or in the successive heat treatment, the above inorganic additives preferably contain the $SiO_2$ ingredient of 10% by weight or more. Also in such a case,. the inorganic additives which can be suitably used have a small particle size and can readily disperse without coagulation in melt-kneading with the aliphatic polyester of the invention.

The inorganic additives are preferably used in an amount not extremely impair transparency of the formed item. The amount is generally 10% by weight or less, preferably 5% by weight or less, more preferably 3% by weight or less, still more preferably 1% by weight or less, most preferably 0.5% by weight or less.

Plasticizers can also be used in combination in order to increase crystallization velocity of the formed item in the preparation process of the invention. No particular restriction is put upon the plasticizers for use in such object so long as the plasticizers have function for increasing the crystallization velocity. The plasticizers which can be used are aromatic compounds such as phthalic acid-based compounds or aliphatic compounds, and include, for example, tributyl acetylcitrate, diisodecyl adipate, dibutyl sebacate, triacetin and other aliphatic esters.

The amount of these plasticizers are usually 30% by weight or less, more preferably 20% by weight or less, further more preferably 10% by weight or less, most preferably 5% or less. The amount exceeding 30% by weight usually impairs transparency and additionally gives adverse effect on the mechanical properties of the formed item.

Other additives can also be added to the formed item prepared by the process of the invention so long as the transparency of the processed item is not impaired by these additives. The object of addition is to improve the properties of the polymer composition such as elastic modulus, tensile strength, flexural strength and other mechanical properties; and resistance to heat and weather.

Exemplary other additives which can be used include, for example, antioxidants, ultraviolet absorbers, antistatic agents, lubricants, stabilizers, release agents, flame retardants, antibacterial agents, dyestuffs, pigments such as metallic pigment and pearl pigment, elastomers such as SBR, NBR and SBS and fillers such as calcium carbonate, clay, impact resistant core-shell particle and impact modifier. These additives can be arbitrarily used depending upon the object and uses.

Preparation of the aliphatic polyester composition by blending and melt-kneading aliphatic polyester in the invention with the transparent nucleating agent such as aliphatic carboxylic acid amide, aliphatic carboxylic acid salt, aliphatic alcohol and aliphatic carboxylic acid ester can be carried out by mixing the raw materials in the solid state, for example, with a Henschel mixer or ribbon blender and successively by melt-kneading the blend with an extruder.

The process for preparing the formed item having transparency and crystallinity in combination, that is, the object of the invention will be illustrated hereinafter.

The formed item of the invention which has transparency and crystallinity in combination can be prepared by crystallizing the above aliphatic polyester composition in the course of or after processing.

Molding and forming are generally carried out by common processes such as injection molding, extrusion, blow forming, inflation forming, contour extrusion, injection blow molding, vacuum pressure forming and spinning.

The aliphatic polyester composition in the invention such as polybutylene succinate which generates crystals on decreasing the temperature at a rate of 10° C./min will hereinafter be referred to as the aliphatic polyester composition (A). The composition (A) can provide a formed item having transparency and crystallinity, that is, thermal resistance by carrying out common processing.

On the other hand, other kind of aliphatic polyester composition such as polylactic acid or a copolymer having a polylactic acid block and polybutylene succinate block which does not form crystals under the same temperature descending condition will hereinafter be referred to as the aliphatic polyester composition (B). In the case of the composition (B), the formed item must be crystallized by some procedures such as heat treatment in the course of or after processing.

Specific methods for crystallizing the aliphatic polyester composition (B) in the course of or after processing include, for example, a method for filling the molten mass of the composition (B) into the mold in the forming step and crystallizing the mass as intact in the mold (hereinafter referred to as an in-mold crystallization mold), and a method for heat-treating the amorphous formed item of the composition (B) (hereinafter referred to as a post crystallization method). The in-mold crystallization method differs from the post crystallization method in the optimum temperature condition for crystallizing the formed item.

(1) Temperature condition in the in-mold crystallization method

The mold temperature in the in-mold crystallization method is preferably in the range from the crystallization initiating temperature to the crystallization terminating temperature, more preferably around the peak of crystallization in the differential scanning colorimetry of the composition. When the mold temperature is higher than the crystallization initiating temperature, crystallization progresses at a remarkably slow velocity and impairs productivity and operating characteristics. In extreme cases, crystallization does not develop and the desired item cannot be obtained. On the other hand, the mold temperature lower than the crystallization terminating temperature leads to very low crystallization velocity and cannot provide the desired item in some cases. The residence time in the mold differs depending upon the composition. However, no particular limitation is put upon the mold residence time so long as the residence time is enough to crystallize the formed item satisfactorily.

(2) Temperature condition in the post-crystallization method

The temperature in the post-crystallization method is preferably in the range from the glass transition temperature (Tg) to the melting point (Tm) of the composition, more preferably (Tg+5° C.) to (Tm−20° C.), most preferably from (Tg+10° C.) to (Tm−40° C.). When the post-crystallization temperature is higher than Tm, the formed item impairs transparency, leads to deformation even by a short time crystallization, and further causes fusion by heating for an extended time. On the other hand, the post-crystallization temperature lower than Tg leads to remarkably low crystallization velocity and cannot provide the formed item having the desired crystallinity. The post-crystallization time differs depending upon the composition. However, no particular limitation is imposed upon the post-crystallization time so long as the formed item can be heat-treated for a time enough to crystallize sufficiently.

Practical forming processes will be illustrated in detail hereinafter.

(1) Injection molding (in-mold crystallization method)

For example, the pellets of.the composition comprising polylactic acid obtained in Preparation Example 2 below described and ethylenebislauramide are melted and injected into a mold maintained at a temperature between the crystallization initiating temperature (135° C.) and the crystallization terminating temperature (65° C.). The injection molded item having transparency and crystallinity in combination which is the object of the invention can be obtained by holding the composition in the mold.

(2) Injection molding (post-crystallization method)

For example, an amorphous molded item is obtained by injection molding the pellets of above (1) at the mold temperature of 20° C. The injection molded item having transparency and crystallinity in combination can be prepared by maintaining the amorphous molded item in the atmosphere having a temperature between Tg (59° C.) and Tm (163° C.) or by bringing the item into contact with a suitable medium having a temperature between Tg (59 ° C.) and Tm (163° C.).

(3) Extrusion (post-crystallization method)

For example, an amorphous film or sheet is prepared from the pellets of the above (1) with a common T-die extruder. The film or sheet is heat-treated by continuously passing through an air oven maintained in the temperature range between Tg (59° C.) and Tm (163° C.) or warm water maintained within 59–100° C. The heat-treatment can also be carried out batchwise. By these procedures, the film or sheet having transparency and crystallinity in combination can be obtained.

(4) Blow forming (post-crystallization method)

For example, an amorphous preform is obtained by melting the pellets of the above (1) in a common blow forming machine and filling into a mold. The preform obtained is softened by heating in a hot oven, inserted in a mold maintained at a temperature between Tg (59° C.) and Tm (163° C.), and blown by pressurized air. Thus, a blow bottle having transparency and crystallinity in combination can be prepared.

In the method, crystallization time of the blow bottle can be reduced by using the pressurized air having an increased temperature, for example, higher than room temperature to less than Tm (163° C.).

(5) vacuum forming and vacuum/pressure forming (in-mold crystallization method)

For example, the amorphous film obtained in the above (3) is subjected to vacuum forming or vacuum/pressure forming with a common vacuum forming machine at a mold temperature maintained between the crystallization initiating temperature (135° C.) and the crystallization terminating temperature (65° C.). Thus the desired formed item having transparency and crystallinity in combination can be obtained.

(6) Vacuum forming and vacuum/pressure forming (vacuum forming of crystallized film)

A formed item having transparency and crystallinity in combination which is the object of the invention can be obtained, for example, by carrying out vacuum/pressure forming of the crystallized film obtained in the above (3).

The aliphatic polyester formed item of the invention which is obtained by the above processing methods has transparency and crystallinity in combination and is extremely thermal resistant.

The description that the aliphatic polyester formed item has transparency in the invention means that, when a formed item having a thickness of 1 mm is superposed upon a newspaper, the characters on the newspaper can be recognized through the formed item, and that the formed item having a thickness of 1 mm has a Haze of 30% or less.

The description that the aliphatic polyester formed item has crystallinity in the invention means that the crystallization degree measured by X-ray diffraction is 10% or more.

The preparation process of the invention can provide the aliphatic polyester formed item which has a crystallization degree of 10% or more, Haze of 30% or less at 1 mm thickness and crystallinity (thermal resistance) and transparency in combination.

The preparation process of the invention can also provide the aliphatic polyester formed item which has a crystallization degree of 30% or more and a Haze of 30% or less, preferably 15% or less and is thermally resistant and transparent at the same time.

The aliphatic polyester formed item in the invention which has transparency, thermal resistance and degradability includes injection molded articles, films, bags, tubes, sheets, cups, bottles, trays and filaments which are obtained by common processing methods. No particular restriction is put upon the shape, size, thickness and design.

Practically, the formed item of the invention can be used, for example, for food packaging bag, dinner set, fork, spoon, food container, tray, dairy product bottle, soft drink bottle, wine bottle, wrap film, toiletry bottle, garbage bag, umbrella, tent, waterproof sheet, adhesive tape, air mat, bleaching solution bottle, detergent bottle; container and wrapper for medicine, medical material and medical device; fishing line, fishing net; container, wrapping material and capsule for agricultural article, fertilizer and seedling; film for agriculture and gardening, and film for product wrapping, overhead projector, heat ray reflection and liquid crystal display.

The films and sheets prepared by the process of the invention can also be used for a laminate of multi-layer structure by adhesive lamination or heat lamination with other materials such as paper and cloth.

Specifically, it has conventionally been a problem that, in the case of heat-laminating paper with an amorphous film of aliphatic polyester such as polylactic acid or a copolymer of polylactic acid block and polybutylene succinate block which has excellent transparency, the polyester film crystallized by the laminating heat and becomes opaque. Thus, uses which require transparency are restricted to adhesive bonded laminates. However, transparent amorphous film of the composition comprising the transparent nucleating agent of the invention can be hot-laminated with paper and cloth while maintaining the transparency.

EXAMPLE

The present invention will hereinafter be illustrated further in detail by way of preparation examples, examples and comparative examples. However, these descriptions are given in order to more readily understand the invention and are not considered to limit the scope of the invention.

Preparation Example

Preparation processes of aliphatic polyester which can be used for the examples and comparative examples will be illustrated below.

Part in the descriptions are part by weight.

The average molecular weight (weight average molecular weight) were measured by gel permeation chromatography under following conditions using polystyrene as a reference.

Apparatus: Shimadzu LC-10AD

Detector: Shimadzu R1D-6A

Column: Hitachi Chemical Co. GL-S350DT-5 and GL-S350DT-5

Solvent: Chloroform

Concentration: 1%

Amount of charge: 20 $\mu$l

Preparation Example 1
[Preparation of poly-L-lactic acid (Polymer A)]

To a thick walled cylindrical stainless steel reaction vessel equipped with a stirrer, 100 parts of L-lactide, 0.01 part of stannous octoate and 0.03 part of lauryl alcohol were charged, deaerated under vacuum for 2 hours and successively substituted with nitrogen. The mixture was heated with stirring in a nitrogen atmosphere at 2000° C. for 3 hours. While maintaining the temperature, the reaction vessel was gradually evacuated to 3mmHg with a vacuum pump by way of a vent and receiver. After an hour from the initiation of deaeration, distillation of the monomer and low molecular weight volatiles were ceased. The reaction vessel was substituted with nitrogen. The product polymer was discharged in the form of a strand from the bottom of the reaction vessel and cut into pellets. Poly-L-lactic acid (Polymer A) thus obtained had a weight average molecular weight of 136,000.

Preparation Example 2
[Preparation of poly-L-lactic acid (Polymer B)

In a 100 liter reaction vessel equipped with a Dean-Stark trap, 10 kg of 90%-L-lactic acid was heated with stirring at 150° C./50 mmHg for 3 hours while distilling out water, 6.2g of tin powder was added, and stirring was further continued at 150° C./30 mmHg for 2 hours to obtain an oligomer. To the oligomer, 28.8 g of tin powder and 21.1 kg of diphenyl ether were added, an azeotropic dehydration reaction was carried out at 150° C. /35 mmHg, distilled water and solvent were separated in the water separator, and solvent alone was returned to the reaction vessel. After 2 hours, the solvent line was reassembled so as to return the solvent to the reaction vessel by way of a column packed with 46 kg of molecular sieve 3A and the reaction was carried out at 150° C./35 mmHg for 40 hours to obtain a solution of poly-L-lactic acid having a average molecular weight of 146,000. To the solution, 44 kg of anhydrous diphenyl ether was added, and the diluted solution was cooled to 40° C. The precipitated crystal was filtered, washed three times with 10kg of n-hexane and dried at 60° C./50 mmHg. To the powder, 12 kg of 0.5N-HCl and 12 kg of ethanol were added, stirred at 35° C. for an hour, filtered, and dried at 60° C. /50 mmHg. Poly-L-lactic acid powder obtained was 6.1 kg (85% yield). Poly-L-lactic acid (Polymer B) thus obtained had a weight average molecular weight of 145,000.

Preparation Example 3
[Preparation of polybutylene succinate/poly-L-lactic acid block copolymer (Polymer C)]

An oligomer was prepared by heat stirring a mixture composed of 50.5 g of 1,4-butanediol, 66.5 g of succinic acid, 293.0 g of diphenyl ether and 2.02 g of metallic tin at 130° C./140 mmHg for 7 hours while distilling water out of the reaction system. Thereafter, a Dean-Stark trap was mounted on the reaction vessel and an azeotropic dehydration reaction was carried out at 140° C./30 mmHg for 8 hours. Successively, a tube packed with 40 g of molecular sieve 3A was mounted on the reaction vessel so as to return the distilled solvent to the reaction vessel after passing through the molecular sieve layer. The reaction was continued with stirring at 130° C./17 mmHg for 49 hours. The reaction mass was dissolved in 600 ml of chloroform and poured into 5 liters of acetone. The precipitated product was sludged three times for 0.5 hour each with a HCl/isopropyl alcohol (IPA) solution having an HCl concentration of 0.7% by weight, washed with IPA, and dried at 60° C. for 6 hours under reduced pressure. Polybutylene succinate thus obtained had a weight average molecular weight of 118,000.

To 80.0 g of polybutylene succinate obtained above, 120.0 g of poly-L-lactic acid having a weight average molecular weight of 20,000 which was obtained by the same procedures as carried out in Preparation Example 2, 800 g of diphenyl ether and 0.7 g of metallic tin were added, and a dehydration polycondensation reaction was carried out again at 130 ° C./17 mmHg for 20 hours. After finishing the reaction, post treatment was carried out by the same procedures as described in Preparation Example 2. The polybutylene succinate/poly-L-lactic acid block copolymer (Polymer C) thus obtained had a weight average molecular weight of 140,000.

Preparation Example 4
[Preparation of polybutylene succinate/polylactic acid block copolymer (Polymer D)]

The same procedures as described in Preparation Example 3 were carried out except that 40.0 g of polybutylene succinate having a weight average molecular weight of 118,000 and 160.0 g of polylactic acid having a weight average molecular weight of 50,000 were used. The block copolymer of polybutylene succinate and polylactic acid (Polymer D) thus obtained had a weight average molecular weight of 136,000.

Preparation Example 5

[Preparation of polybutylene succinate/polylactic acid block copolymer (Polymer E)]

The same procedures as described in Preparation Example 3 were carried out except that 20.0 g of polybutylene succinate having a weight average molecular weight of 118,000 and 180.0 g of polylactic acid having a weight average molecular weight of 100,000 were used. The block copolymer of polybutylene succinate and polylactic acid (Polymer E) thus obtained had a weight average molecular weight of 142,000.

Preparation Example 6

[Preparation of polycaproic acid/polylactic acid block copolymer (Polymer F)]

The same procedures as described in Preparation Example 2 were carried out except that L-lactic acid was replaced by 6-hydroxycaproic acid. Polycaproic acid thus obtained had a weight average molecular weight of 150,000.

The same procedures as described in Preparation Example 3 were carried out by using 20.0 g of polycaproic acid obtained above and 180.0 g of polylactic acid having a weight average molecular weight of 100,000. The block copolymer of polycaproic acid and polylactic acid (Polymer F) thus obtained had a weight average molecular weight of 153,000.

Preparation Example 7

[Preparation of polybutylene succinate (Polymer G)]

An oligomer was prepared by heat stirring a mixture composed of 50.5 g of 1,4-butanediol, 66.5 g of succinic acid, 293.0 g of diphenyl ether and 2.02 g of metallic tin at 130° C./140mmHg for 7 hours while distilling water out of the reaction system. Thereafter, a Dean-Stark trap was mounted on the reaction vessel and an azeotropic dehydration reaction was carried out at 140° C./30 mmHg for 8 hours. Successively, a tube packed with 40 g of molecular sieve 3A was mounted on the reaction vessel so as to return the distilled solvent to the reaction vessel after passing through the molecular sieve layer. The reaction was continued with stirring at 130° C./17 mmHg for 49 hours. The reaction mass was dissolved in 600 ml of chloroform and poured into 5 liters of acetone. The precipitated product was sludged three times for 0.5 hour each with a HCl/isopropyl alcohol (IPA) solution having an HCl concentration of 0.7% by weight, washed with IPA, and dried at 60° C. for 6 hours under reduced pressure. Polybutylene succinate (Polymer G) thus obtained had a weight average molecular weight of 118,000 (92% Yield).

Example and Comparative Example

Properties of these processed items which were prepared by using aliphatic polyester compositions obtained in Examples were evaluated under following conditions.

1) Haze value

Measured by using Haze Meter manufactured by Tokyo Denshoku Co in accordance with JIS K-6714.

2) Crystallinity

Processed specimens were measured with an X-ray diffractometer (Rint1500 manufactured by Rigaku Denki Co.) and area ratio of crystallization peak for total area was caluculated.

3) Vicat softening temperature

Processed specimens were measured under load of 1 kgf in accordance with ASTM-D1525

4) Crystallization initiation temperature and crystallization termination temperature Measured by using a differential scanning calorimeter: DSC-50 (manufactured by Shimadzu Seisakusho Co.)

Processed specimens were melted and successively measured under a temperature decrease rate of 10° C./min. The temperature where beginning of the peak of crystallization was observed was defined as the crystallization initiation temperature. The temperature where the crystallization peak was ceased was defined as the crystallization termination temperature.

5) Glass transition temperature (Tg) and melting point (Tm)

Processed specimens were measured with a differential scanning calorimeter: DSC-50 (manufactured by Shimadzu Seisakusho Co.). When the temperature was increased at the rate of 10° C./min, the temperature where the specimen varied to a rubber like state was defined as the glass transition temperature (Tg) and the temperature where the top of the melting peak was observed was defined as melting point (Tm).

Examples 1-1-1-9

Each polymer obtained in Preparation Examples 1–6 was individually mixed by using a Henschel mixer with each aliphatic carboxylic acid amide in a proportion shown in Table 1. Each mixture thus obtained was individually melt-kneaded with an extruder at a cylinder temperature of 170–210° C. and pelletized. The pellet was individually heated at 1800° C. for 2 minutes and the molten pellet was pressed at 180° C. under pressure of 100 kgf/cm² for 1 minute to obtain a film having a thickness of 150μ. The film was heat-treated under conditions shown in Table 1 and Haze and crystallinity were measured. Results are illustrated in Table 1.

Comparative Examples 1-1-1-6

The pellet and the film of each polymer were prepared by carrying out the same procedures as Examples 1-1-1-9 expect that aliphatic carboxylic acid amide was not added.

The film was heat-treated under conditions shown in Table 1, and Haze and crystallinity of the film specimen were measured. Results are illustrated in Table 1.

The indications in Table 1 have following meaning.

1) Polymer

The polymer was prepared in Preparation Examples 1–6.

2) Additive

A: Erucamide (NEUTRON-S, manufactured by Nippon Seika Co.)

B: Behenamide (BNT, manufactured by Nippon Seika Co.)

C: Oleamide (NEUTRON, manufactured by Nippon Seika Co.)

D: N-Stearylerucamide (SNT, manufactured by Nippon Seika Co.)

TABLE 1

|  | Ex. 1-1 | Ex. 1-2 | Ex. 1-3 | Ex. 1-4 | Ex. 1-5 | Ex. 1-6 | Ex. 1-7 | Ex. 1-8 | Ex. 1-9 |
|---|---|---|---|---|---|---|---|---|---|
| Polymer | A | B | C | D | E | F | D | D | D |
| Nucleating agent | A | A | A | A | A | A | B | C | D |
| (wt-%) | 1.0 | 1.0 | 0.3 | 0.1 | 0.5 | 1.0 | 0.5 | 0.5 | 0.5 |
| Properties before heat-treatment |  |  |  |  |  |  |  |  |  |
| Crystallinity (%) | 0 | 0 | 0 | 0 | 0 | 0 | 0 | 0 | 0 |
| Haze (%/1 mm) | 1.0 | 1.1 | 0.9 | 1.3 | 1.0 | 1.1 | 1.3 | 1.3 | 1.3 |
| Conditions of heat-treatment |  |  |  |  |  |  |  |  |  |
| temperature (° C.) | 100 | 100 | 80 | 80 | 80 | 80 | 80 | 80 | 80 |
| time (minutes) | 20 | 20 | 10 | 10 | 10 | 10 | 10 | 10 | 10 |
| Properties after heat-treatment |  |  |  |  |  |  |  |  |  |
| Crystallinity (%) | 33.6 | 32.7 | 26.5 | 28.1 | 36.1 | 35.2 | 27.7 | 26.9 | 30.2 |
| Haze (%/1 mm) | 6.5 | 4.5 | 3.2 | 3.1 | 3.5 | 3.5 | 3.3 | 4.1 | 3.7 |

|  | Comp. Ex. 1-1 | Comp. Ex. 1-2 | Comp. Ex. 1-3 | Comp. Ex. 1-4 | Comp. Ex. 1-5 | Comp. Ex. 1-6 |
|---|---|---|---|---|---|---|
| Polymer | A | B | C | D | E | F |
| Nucleating agent | — | — | — | — | — | — |
| (wt-%) | — | — | — | — | — | — |
| Properties before heat-treatment |  |  |  |  |  |  |
| Crystallinity (%) | 0 | 0 | 0 | 0 | 0 | 0 |
| Haze (%/1 mm) | 0.7 | 0.6 | 0.8 | 0.7 | 0.7 | 1.1 |
| Conditions of heat-treatment |  |  |  |  |  |  |
| temperature (° C.) | 100 | 100 | 80 | 80 | 80 | 80 |
| time (minutes) | 20 | 20 | 10 | 10 | 10 | 10 |
| Properties after heat-treatment |  |  |  |  |  |  |
| Crystallinity (%) | 45.2 | 43.3 | 29.5 | 27.0 | 33.2 | 31.8 |
| Haze (%/1 mm) | 65.0 | 68.0 | 43.3 | 38.9 | 41.7 | 39.1 |

Examples 2-1–2-6

Each polymer obtained in Preparation Examples 1–6 was individually mixed by using a Henschel mixer with each aliphatic carboxylic acid salt or aliphatic alcohol or aliphatic ester in a proportion shown in Table 2. Each mixture thus obtained was individually melt-kneaded with an extruder at a cylinder temperature of 170–210° C. and pelletized. The pellet was individually heated at 180° C. for 2 minutes and the molten pellet was pressed at 180° C. under pressure of 100 kgf/cm² for 1 minute to obtain a film having a thickness of 150μ. The film was heat-treated under conditions shown in Table 2 and Haze and crystallinity were measured. Results are illustrated in Table 2.

Comparative Examples 2-1–2-4

The pellet and the film of each polymer were individually prepared by carrying out the same procedures as Examples 2-1–2-6 except that aliphatic carboxylic acid salt or aliphatic alcohol or aliphatic ester was not added.

The film was heat-treated under the conditions shown in Table 2 and Haze and crystallinity of the film specimen were measured. Results are illustrated in Table 2.

The indications in Table 2 have following meaning.

1) Polymer

The polymer or copolymer was prepared in Preparation Examples 1–6.

2) Additive

A: Sodium stearate
  B: Potassium stearate
  C: Zinc stearate
  D: Stearyl alcohol
  E: Ethylene glycol distearate

TABLE 2

|  | Ex. 2-1 | Ex. 2-2 | Ex. 2-3 | Ex. 2-4 | Ex. 2-5 | Ex. 2-6 | Comp. Ex. 2-1 | Comp. Ex. 2-2 | Comp. Ex. 2-3 | Comp. Ex. 2-4 |
|---|---|---|---|---|---|---|---|---|---|---|
| Polymer | C | D | E | F | C | C | C | D | E | F |
| Nucleating agent | A | B | C | A | D | E | — | — | — | — |
| (wt-%) | 1.0 | 0.5 | 0.3 | 1.0 | 1.0 | 1.0 | — | — | — | — |

TABLE 2-continued

|  | Ex. 2-1 | Ex. 2-2 | Ex. 2-3 | Ex. 2-4 | Ex. 2-5 | Ex. 2-6 | Comp. Ex. 2-1 | Comp. Ex. 2-2 | Comp. Ex. 2-3 | Comp. Ex. 2-4 |
|---|---|---|---|---|---|---|---|---|---|---|
| Properties before heat-treatment | | | | | | | | | | |
| Crystallinity (%) | 0 | 0 | 0 | 0 | 0 | 0 | 0 | 0 | 0 | 0 |
| Haze (%/1 mm) | 0.9 | 1.3 | 1.0 | 1.1 | 0.9 | 0.9 | 0.9 | 1.3 | 1.0 | 1.1 |
| Conditions of heat-treatment | | | | | | | | | | |
| temperature (° C.) | 80 | 80 | 80 | 80 | 80 | 80 | 80 | 80 | 80 | 80 |
| time (minutes) | 30 | 30 | 30 | 30 | 30 | 30 | 10 | 10 | 10 | 10 |
| Properties after heat-treatment | | | | | | | | | | |
| Crystallinity (%) | 35.1 | 28.7 | 31.2 | 37.2 | 36.2 | 27.8 | 29.5 | 27.0 | 33.2 | 31.8 |
| Haze (%/1 mm) | 3.4 | 4.6 | 5.1 | 4.0 | 3.2 | 3.5 | 43.3 | 38.9 | 41.7 | 39.1 |

Example 3-1

[Injection molding]

After thoroughly mixing in a Henschel mixer 100 parts by weight of poly-L-lactic acid (Polymer B) obtained in Preparation Example 2 and 1% by weight of ethylene bislauramide as a transparent nucleating agent, the mixture was melt-kneaded with an extruder at a cylinder temperature of 170–210° C. and pelletized. The pellet was injection molded with an injection molding machine: JSW-75 (manufactured by Japan Steel Work Co.) by melting at a cylinder temperature of 180–200° C., filling into the mold at mold temperature of 30° C., and cooling in the mold for 30 seconds to obtain a transparent molded plate having a smooth surface. The molded plate had a thickness of 1.0 mm, Haze value of 2%, crystallinity of 0%, Vicat softening temperature of 59° C., glass transition temperature (tg) of 59° C., crystallization initiation temperature of 135° C., crystallization termination temperature of 65° C. and melting point (Tm) of 163° C.

The plate was heat-treated in a drying oven at 120° C. for 5 minutes. The heat-treated plate had a Haze of 7%, crystallinity of 42% and Vicat softening temperature of 150° C. Results are illustrated in Table 3.

Examples 3-2–3-31

[Injection molding]

The same procedures as described in Example 3-1were carried out except that the polymer and kind and amount of the transparent nucleating agent were changed as illustrated in Table 3.

A Haze value, crystallinity and Vicat softening temperature were measured on these molded plate specimens. Results are illustrated in Table 3.

Comparative Example 3-1

[Injection molding]

The same procedures as described in Example 1 were carried out except'that the transparent nucleating agent of ethylene-bislauramide was omitted. The molded plate obtained had a Haze value of 2%, crystallinity of 0%, and Vicat softening temperature of 59° C.

The molded plate was heat-treated in a drying oven at 120° C. for 5 minutes. The heat-treated plate obtained had a Haze value of 83%, crystallinity of 43% and Vicat softening temperature of 150° C. Results are illustrated in Table 3.

Comparative Examples 3-2–3-7

[Injection molding]

The same procedures as described in Example 3-1 were carried out except that the polymer, kind and amount of the transparent nucleating agent, and heat-treatment conditions in the drying oven were changed as illustrated in Table 3. A haze value, crystallinity and Vicat softening temperature were measured on each plate specimen. Results are illustrated in Table 3.

The indications in Table 3 have following meaning.

1) Polymer

The polymer or copolymer was prepared in Preparation Examples 1–7.

2) Additive

A: Ethylenebislauramide
B: Ethylenebisoleamide
C: Ethylenebiscapramide
D: m-Xylylenebisstearamide
E: m-Xylylenebis-12-hydroxystearamide
F: Palmitamide
G: Stearamide
H: Erucamide
I: Behenamide
J: Ricinolamide
K: Hydroxystearamide
L: N-Oleylpalmitamide
M: N-Stearylerucamide
N: Ethylene glycol distearate
O: Stearyl alcohol
P: Sodium stearate
Q: Potassium stearate
R: Zinc stearate
S: Calcium montanate

TABLE 3

|  | Ex. 3-1 | Ex. 3-2 | Ex. 3-3 | Ex. 3-4 | Ex. 3-5 | Ex. 3-6 | Ex. 3-7 | Ex. 3-8 | Ex. 3-9 | Ex. 3-10 |
|---|---|---|---|---|---|---|---|---|---|---|
| Polymer | B | B | A | A | B | C | D | D | E | D |
| Nucleating agent | A | B | C | D | E | A | B | C | D | E |
| (wt-%) | 1.0 | 0.8 | 1.5 | 1.0 | 1.0 | 1.0 | 1.0 | 1.0 | 1.0 | 1.0 |
| Properties before heat-treatment | | | | | | | | | | |
| Crystallinity (%) | 0 | 0 | 0 | 0 | 0 | 0 | 0 | 0 | 0 | 0 |
| Haze (%/1 mm) | 2.0 | 2.0 | 2.5 | 2.0 | 2.0 | 3.0 | 3.0 | 3.0 | 2.5 | 3.0 |
| Vicat softening temperature (° C.) | 59 | 59 | 59 | 59 | 59 | 43 | 50 | 50 | 57 | 50 |
| Conditions of heat-treatment | | | | | | | | | | |
| temperature (° C.) | 120 | 110 | 70 | 90 | 80 | 80 | 80 | 80 | 80 | 70 |
| time (minutes) | 5 | 5 | 10 | 5 | 5 | 5 | 5 | 5 | 5 | 10 |
| Properties after heat-treatment | | | | | | | | | | |
| Crystallinity (%) | 42 | 44 | 46 | 41 | 43 | 35 | 33 | 37 | 43 | 37 |
| Haze (%/1 mm) | 7 | 9 | 15 | 11 | 11 | 6 | 5 | 6 | 8 | 5 |
| Vicat softening temperature (° C.) | 150 | 150 | 150 | 150 | 150 | 115 | 124 | 124 | 143 | 124 |

|  | Ex. 3-11 | Ex. 3-12 | Ex. 3-13 | Ex. 3-14 | Ex. 3-15 | Ex. 3-16 | Ex. 3-17 | Ex. 3-18 | Ex. 3-19 | Ex. 3-20 |
|---|---|---|---|---|---|---|---|---|---|---|
| Polymer | D | D | D | C | C | C | E | E | D | D |
| Nucleating agent | F | G | H | I | J | K | L | M | N | O |
| (wt-%) | 1.0 | 1.0 | 1.0 | 1.0 | 1.0 | 1.0 | 1.0 | 1.0 | 1.0 | 1.0 |
| Properties before heat-treatment | | | | | | | | | | |
| Crystallinity (%) | 0 | 0 | 0 | 0 | 0 | 0 | 0 | 0 | 0 | |
| Haze (%/1 mm) | 3.0 | 3.0 | 3.0 | 3.0 | 3.0 | 3.0 | 2.5 | 2.5 | 3.0 | 3.0 |
| Vicat softening temperature (° C.) | 50 | 50 | 50 | 43 | 43 | 43 | 57 | 57 | 50 | 50 |
| Conditions of heat-treatment | | | | | | | | | | |
| temperature (° C.) | 70 | 70 | 70 | 65 | 65 | 65 | 80 | 80 | 70 | 70 |
| time (minutes) | 5 | 5 | 5 | 5 | 5 | 10 | 15 | 5 | 10 | 10 |
| Properties after heat-treatment | | | | | | | | | | |
| Crystallinity (%) | 39 | 34 | 37 | 32 | 33 | 31 | 36 | 35 | 37 | 36 |
| Haze (%/1 mm) | 6 | 6 | 7 | 5 | 6 | 5 | 6 | 6 | 5 | 7 |
| Vicat softening temperature (° C.) | 124 | 124 | 124 | 115 | 115 | 115 | 145 | 145 | 124 | 124 |

|  | Ex. 3-21 | Ex. 3-22 | Ex. 3-23 | Ex. 3-24 | Ex. 3-25 | Ex. 3-26 | Ex. 3-27 | Ex. 3-28 | Ex. 3-29 | Ex. 3-30 |
|---|---|---|---|---|---|---|---|---|---|---|
| Polymer | D | D | D | D | G | G | G | G | G | G |
| Nucleating agent | P | Q | R | S | H | I | G | A | N | P |
| (wt-%) | 1.0 | 1.0 | 1.0 | 1.0 | 1.0 | 1.0 | 1.0 | 1.0 | 1.0 | 1.0 |
| Properties before heat-treatment | | | | | | | | | | |
| Crystallinity (%) | 0 | 0 | 0 | 0 | 35 | 34 | 36 | 37 | 32 | 36 |
| Haze (%/1 mm) | 3.0 | 3.0 | 3.0 | 3.0 | 27 | 25 | 23 | 26 | 29 | 24 |
| Vicat softening temperature (° C.) | 50 | 50 | 50 | 50 | 110 | 110 | 110 | 110 | 110 | 110 |
| Conditions of heat-treatment | | | | | | | | | | |
| temperature (° C.) | 80 | 90 | 90 | 90 | — | — | — | — | — | — |
| time (minutes) | 5 | 5 | 5 | 5 | — | — | — | — | — | — |
| Properties after heat-treatment | | | | | | | | | | |
| Crystallinity (%) | 35 | 35 | 37 | 37 | — | — | — | — | — | — |
| Haze (%/1 mm) | 9 | 8 | 9 | 8 | — | — | — | — | — | — |
| Vicat softening temperature (° C.) | 124 | 124 | 124 | 124 | — | — | — | — | — | — |

TABLE 3-continued

|  | Ex. 3-31 | Comp. Ex. 3-1 | Comp. Ex. 3-2 | Comp. Ex. 3-3 | Comp. Ex. 3-4 | Comp. Ex. 3-5 | Comp. Ex. 3-6 | Comp. Ex. 3-7 |
|---|---|---|---|---|---|---|---|---|
| Polymer | G | B | B | A | C | D | E | G |
| Nucleating agent | Q | — | A | — | — | — | — | — |
| (wt-%) | 1.0 | — | 1.0 | — | — | — | — | — |
| Properties before heat-treatment | | | | | | | | |
| Crystallinity (%) | — | 0 | 0 | 0 | 0 | 0 | 0 | 37 |
| Haze (%/1 mm) | — | 2.0 | 2.0 | 2.0 | 3.0 | 3.0 | 2.0 | 89 |
| Vicat softening temperature (° C.) | — | 59 | 59 | 59 | 43 | 50 | 57 | 110 |
| Conditions of heat-treatment | | | | | | | | |
| temperature (° C.) | | 120 | 50 | 70 | 90 | 80 | 80 | — |
| time (minutes) | | 5 | 20 | 10 | 10 | 10 | 10 | |
| Properties after heat-treatment | | | | | | | | |
| Crystallinity (%) | 36 | 43 | 0 | 44 | 33 | 37 | 43 | — |
| Haze (%/1 mm) | 28 | 83 | 2 | 81 | 70 | 75 | 77 | — |
| Vicat softening temperature (° C.) | 110 | 150 | 59 | 150 | 115 | 124 | 143 | — |

Example 4-1
[Blow molding]

Poly-L-lactic acid (Polymer B) obtained in Preparation Example 2 was thoroughly mixed in a Henschel mixer with 1% by weight of a transparent nucleating agent ethylene-bislauramide. The mixture was melt-kneaded with an extruder at a cylinder temperature of 170–210° C. and pelletized. The pellet was molded with an injection blow molding machine: ASB-50 (manufactured by Nissei ASB Machinery Co.) by melting at a cylinder temperature of 180–200° C., filling into a mold (A) at a mold temperature of 20° C., and cooling for 30 seconds. A closed-end parison having a wall thickness of 2.0 mm was thus obtained as a preform.

The parison was heated to 120° C. in a heating oven, inserted into a mold (B) which was maintained at 120° C. and blown with the air pressure of 4 kg/cm² to expand twice in the both longitudinal and transverse directions. A container having an internal volume of 500 ml was thus obtained. The container had a wall thickness of 0.5 mm, a Haze value of 4% (8% for 1 mm thickness), crystallinity of 45% and Vicat softening temperature of 150° C.

Comparative Example 4-1
[Blow molding]

The same procedures as described in Example 4-1 were carried out except that the transparent nucleating agent ethylene-bislauramide was omitted. The container obtained had a Haze value of 75% (80% for 1 mm thickness), crystallinity of 43%, and Vicat softening temperature of 150 ° C.

Comparative Example 4-2
[(Blow molding]

The same procedures as described in Example 4-1 were carried out except that parison temperature was 55° C. and mold (B) temperature was 30° C. The container obtained had a Haze value of 1.5% (2% for 1 mm thickness), crystallinity of 0%, and Vicat softening temperature of 59 ° C.

Example 5-1
[Extrusion sheet forming]

Poly-L-lactic acid (Polymer A) obtained in Preparation Example 1 was thoroughly mixed in a Henschel mixer with 1% by weight of a transparent nucleating agent ethylene-bislauramide, and pelletized at the condition of 170–210° C. in the cylinder temperature of the extruder. The pellet obtained was melted with a T-die extruder having a barrel diameter of 50 mm (manufactured by Frontier Co.) at cylinder temperature of 180–200° C., and delivered through a T-die of 400 mm in width at die temperature of 185° C. A transparent sheet having a thickness of 0.5 mm was obtained. The extruded sheet had a Haze value of 1% (2% for 1 mm thickness) and crystallinity of 0%.

Further, the sheet was heat-treated by continuously passing through a hot air-stream oven at 100° C. with a residence time of 2 minutes. The heat-treated sheet had a Haze value of 4% (8% for 1 mm thickness) and crystallinity of 40%.

Comparative Example 5-1
[Extrusion sheet forming]

The same procedures as described in Example 5-1 were carried out except that the transparent nucleating agent ethylene-bislauramide was omitted. The heat-treated sheet obtained had a Haze value of 73% (84% for 1 mm thickness) and crystallinity of 38%.

Comparative Example 5-2
[Extrusion sheet forming]

The extruded sheet obtained in Example 5-1 which had a thickness of 0.5 mm, a Haze value of 1.0% and crystallinity of 0% was heat-treated in a hot air-stream oven at 55° C. for 20 minutes. The heat-treated sheet obtained had a Haze value of 1% (2% for 1 mm thickness) and crystallinity of 0%.

Example 6-1
[Inflation forming (tubular film extrusion)]

The polybutylene succinate/polylactic acid block copolymer (Polymer D) obtained in Preparation Example 4 was thoroughly mixed in a Henschel mixer with 1% by weight of a transparent nucleating agent stearamide, melt-kneaded with an extruder at cylinder temperature of 170–210° C., and pelletized.

The pellet was melted with an inflation forming machine having a barrel diameter of 45 mm (manufactured by Kawata Seisakusho Co.) at cylinder temperature of 165–180° C., delivered through an inflation die at die temperature of 170° C., and blown at a blow-up ratio (BUR) of 2.5 to obtain an inflation film (tubular film) having a flat width of 250 mm and thickness of 0.05 mm.

The film thus obtained had a Haze value of 0.5% (3% for 1 mm thickness), crystallinity of 0%, glass transition temperature (Tg) of 52° C., crystallization initiation temperature of 125° C., crystallization termination temperature of 45° C., and melting point (Tm) of 163° C.

The inflation film thus obtained was heat-treated in warm water at temperature of 85° C. and residence time of 2 minutes. The heat-treated film obtained had a Haze value of 1.5% (5% for 1 mm thickness) and crystallinity of 36%.

Comparative Example 6-1
[Inflation forming]

The same procedures as described in Example 6-1 was carried out except that transparent nucleating agent stearamide was omitted. The inflation film obtained had a Haze value of 43% (70% for 1 mm thickness) and crystallinity of 36%.

Example 7-1
[Contour extrusion forming]

Poly-L-lactic acid (Polymer B) obtained in Preparation Example 2 was thoroughly mixed in a Henschel mixer with 1% by weight of a transparent nucleating agent ethylene-bislauramide. The mixture was melt-kneaded with an extruder at cylinder temperature of 170–210° C. and pelletized. The pellet was melted with a contour die extruder having a barrel diameter of 40 mm (manufactured by Frontier Co.) at cylinder temperature of 180–200° C., extruded through a hollow rectangular die at die temperature of 175° C., and formed in a vacuum device mounted sizing box at cooling temperature of 30° C. to obtain a hollow item having a wall thickness of 0.5 mm and outside dimensions of 40×30 mm. The hollow item obtained had a Haze value of 1.5% (2% for 1 mm thickness) and crystallinity of 0%.

Further, the hollow item was heat-treated by continuously passing through a hot air-stream drying oven at temperature of 100° C. and residence time of 2 minutes.

The heat-treated hollow item had a Haze value of 3.5% (8% for 1 mm thickness) and crystallinity of 43%.

Comparative Example 7-1
[Contour extrusion forming]

The same procedures as described in Example 7-1 was carried out except that the transparent nucleating agent ethylene-bislauramide was omitted. The hollow item obtained had a Haze value of 71% (77% for 1 mm thickness) and crystallinity of 42%.

Example 8-1
[Vacuum pressure forming: forming of a crystallized sheet]

Poly-L-lactic acid (Polymer'B) obtained in Preparation Example 2 was thoroughly mixed in a Henschel mixer with 1% by weight of a transparent nucleating agent ethylene-bislauramide. The mixture was melt-kneaded with an extruder at cylinder temperature of 170–210° C. and pelletized. The pellet was melted with a T-die extruder having a barrel diameter of 50 mm (manufactured by Frontier Co.) at cylinder temperature of 180–200° C. and extruded through a T-die of 400 mm in width at die temperature of 185° C. to obtain a sheet having thickness of 0.25 mm. The extruded sheet had a Haze value of 1.0% (2% for 1 mm thickness) and crystallinity of 0%. Further, the extruded sheet was heat-treated by continuously passing through a hot air-stream oven at temperature of 100° C. and residence time of 2 minutes. The heat-treated sheet had a Haze value of 3.0% (8% for 1 mm thickness) and crystallinity of 40%.

Successively, the heat-treated sheet was formed by using a vacuum/pressure forming machine equipped with an ellipsoid mold having a major axis of 146 mm, minor axis of 100 mm, and depth of 30 mm. The sheet was softened at heating temperature of 120° C. and retention time of 30 seconds, and closely adhered to the ellipsoid mold at mold temperature of 60° C. for 10 seconds under air pressure of 4 kgf/cm$^2$ on one side of the sheet and simultaneously under reduced pressure of 50 mmHg on the other side of the sheet. The formed item thus obtained had a Haze value of 3% (8% for 1 mm thickness) and crystallinity of 40%.

Example 8-2
[Vacuum pressure forming: crystallization of an amorphous sheet in a mold]

The extruded sheet obtained in Example 8-1 and had a Haze value of 1.0% and crystallinity of 0% was used. The extruded sheet was mounted on the same ellipsoid vacuum pressure forming machine as used in the Example 8-1, softened at heating temperature of 85° C. and retention time of 40 seconds, and closely adhered to the ellipsoid mold at mold temperature of 100° C. for one minute under air pressure of 4 kgf/cm$^2$ on one use of the sheet and simultaneously under reduced pressure of 50 mmHg on the other side of the sheet. The formed item thus obtained had a Haze value of 4% (9% for 1 mm thickness) and crystallinity of 43%.

Comparative Example 8-1

The same procedures as described in Example 8-1 were carried out except that the transparent nucleating agent ethylene-bislauramide was omitted. The formed item thus obtained had a Haze value of 73% (82% for 1 mm thickness) and crystallinity of 42%.

Comparative Example 8-2

The same procedures as described in Example 8-2 were carried out except that mold temperature was 55° C. The formed item obtained had a Haze value of 1% (2% for 1 mm thickness) and crystallinity of 0%.

What is claimed is:

1. A film or molded article of an aliphatic polyester comprising an aliphatic polyester and one or more transparent nucleating agents having a melting point of 40–300° C. selected from the group consisting of an aliphatic carboxylic acid amide, an aliphatic carboxylic acid salt, an aliphatic alcohol and an aliphatic carboxylic acid ester, and having transparency and crystallinity in combination wherein the film or molded article has a haze value of 30% or less for a 1 mm thickness and crystallization degree of 10% or more and wherein the amount of the transparent nucleating agent is 0.1–10 parts by weight for 100 parts by weight of aliphatic polyester.

2. The film or molded article of the aliphatic polyester according to claim 1 wherein the aliphatic polyester is polylactic acid.

3. The film or molded article according to claim 2 wherein the transparent nucleating agent is an aliphatic carboxylic acid amide.

4. The film or molded article according to claim 3 wherein the aliphatic carboxylic acid amide is one or more compounds selected from the group consisting of etheylenebiscapramide, ethylenebislauramide, ethylenebisoleamide, m-xylylenebisstearamide and m-xylylenebis-12-hydroxystearamide.

5. The film or molded article of the aliphatic polyester according to claim 1 wherein the aliphatic polyester comprises one or more polyesters selected from the group consisting of polybutylene succinate and a block copolymer of polylactic acid and polybutylene succinate.

6. The film or molded article of the aliphatic polyester according to claim 5 wherein the transparent nucleating agent is one or more compounds selected from the group consisting of palmitamide, stearamide, erucamide, behenamide, ricinolamide, hydroxystearamide, N-oleylpalmitamide, N-stearylerucamide, ethylenebiscapramide, ethylenebislauramide, ethylenebisoleamide, m-xylylenebisstearamide, m-xylylenebis-12-hydroxystearamide, sodium stearate, potassium stearate, zinc stearate, calcium montanate, ethylene glycol distearate and stearyl alcohol.

\* \* \* \* \*